US012664059B2

(12) United States Patent
Cherey et al.

(10) Patent No.: US 12,664,059 B2
(45) Date of Patent: Jun. 23, 2026

(54) SYSTEMS AND METHODS FOR GENERATING A DECENTRALIZED INDEX FOR A DISTRIBUTED BACKUP SOLUTION

(71) Applicant: Acronis International GmbH, Schaffhausen (CH)

(72) Inventors: Maxim Cherey, Chandler, AZ (US); Mikhail Rybakov, İstanbul (TR); Ivan Krestinin, Turin (IT); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 0 days.

(21) Appl. No.: 18/936,079

(22) Filed: Nov. 4, 2024

(65) Prior Publication Data

US 2026/0127078 A1 May 7, 2026

(51) Int. Cl.
*G06F 11/00* (2006.01)
*G06F 11/1446* (2026.01)

(52) U.S. Cl.
CPC ...... *G06F 11/1464* (2013.01); *G06F 11/1451* (2013.01)

(58) Field of Classification Search
CPC .......................... G06F 11/1464; G06F 11/1451
USPC ........................................................ 714/1–57
See application file for complete search history.

(56) References Cited

U.S. PATENT DOCUMENTS

| | | | | |
|---|---|---|---|---|
| 10,789,205 | B1 * | 9/2020 | Haravu | G06F 11/1451 |
| 2006/0074925 | A1 * | 4/2006 | Bixby | G06F 16/10 |
| 2006/0149997 | A1 * | 7/2006 | Chai | G06F 11/1469 714/E11.122 |
| 2008/0229037 | A1 * | 9/2008 | Bunte | G06F 21/6218 711/E12.103 |
| 2010/0115332 | A1 * | 5/2010 | Zheng | G06F 11/1461 714/E11.091 |
| 2012/0159260 | A1 * | 6/2012 | Fortune | G06F 9/454 714/38.1 |
| 2013/0085999 | A1 * | 4/2013 | Tung | G06F 11/1464 707/654 |
| 2023/0132278 | A1 * | 4/2023 | Xiao | G06F 11/1469 714/6.3 |
| 2023/0205630 | A1 * | 6/2023 | Volvovski | G06F 11/1076 375/240.15 |

* cited by examiner

*Primary Examiner* — Sarai E Butler
(74) *Attorney, Agent, or Firm* — ArentFox Schiff LLP; Michael Fainberg

(57) ABSTRACT

A system generates a plurality of data archives using a plurality of backup agents in the distributed backup system, wherein each respective backup agent is configured to: create a respective data archive; build a respective data index while populating the respective data archive such that a data chunk is indexed simultaneously with the data chunk being added to the respective data archive; and upload the respective data archive and the respective data index to a centralized storage of the distributed backup system. The system receives, by the centralized storage, the plurality of data archives and a plurality of data indexes from the plurality of backup agents, and merges, by the centralized storage, the plurality of data indexes for access by a user.

17 Claims, 4 Drawing Sheets

100

300

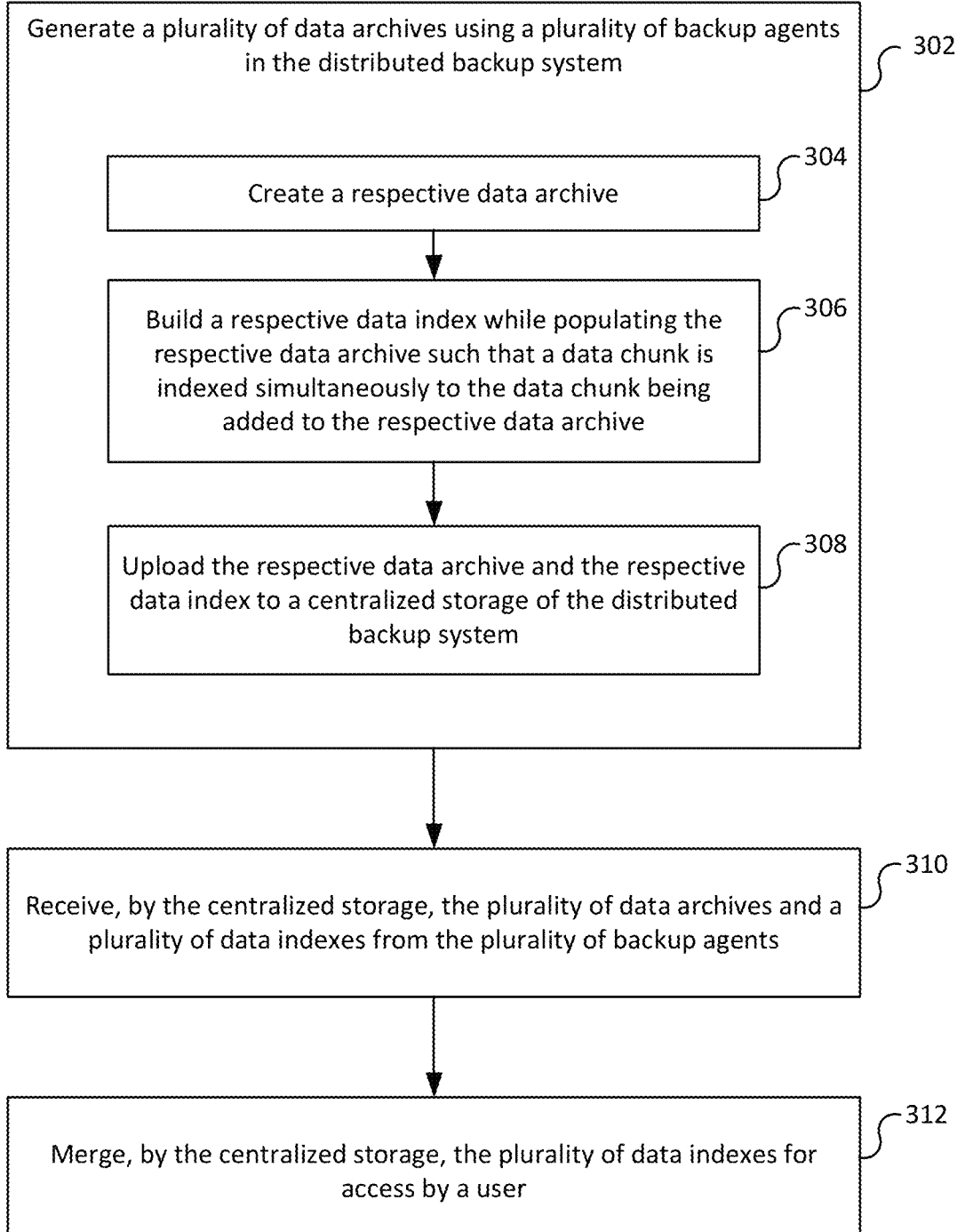

Generate a plurality of data archives using a plurality of backup agents in the distributed backup system ⌐302

Create a respective data archive ⌐304

Build a respective data index while populating the respective data archive such that a data chunk is indexed simultaneously to the data chunk being added to the respective data archive ⌐306

Upload the respective data archive and the respective data index to a centralized storage of the distributed backup system ⌐308

Receive, by the centralized storage, the plurality of data archives and a plurality of data indexes from the plurality of backup agents ⌐310

Merge, by the centralized storage, the plurality of data indexes for access by a user ⌐312

FIG. 3

SYSTEMS AND METHODS FOR GENERATING A DECENTRALIZED INDEX FOR A DISTRIBUTED BACKUP SOLUTION

FIELD OF TECHNOLOGY

The present disclosure relates to the field of data storage, and, more specifically, to systems and methods for generating a decentralized index for a distributed backup solution.

BACKGROUND

The typical data backup process consists of several sequential steps. After a data archive is created, a backup agent uploads the data to a centralized storage. After that, to enable browsing the stored data or to search through it, an index is built. Conventionally, index creation is a heavy time and resource consuming process because it requires going through all the data in the archive. In a distributed system, after the index is created, it is merged and stored along with the indexes of other data archives.

SUMMARY

The present disclosure describes building a data index for data archives based on the pre-calculated information that is collected by backup agents along the backup process. The disclosed systems and methods allow for building the full index through all the data archives in a an efficient way-avoiding the need for high resource and processing time consumption in the centralized storage, and allowing immediate access to an up-to-date index as soon as a data archive is added onto the centralized storage.

In one exemplary aspect, the techniques described herein relate to a method for managing a distributed backup system, the method including: generating a plurality of data archives using a plurality of backup agents in the distributed backup system, wherein each respective backup agent is configured to: create a respective data archive; build a respective data index while populating the respective data archive such that a data chunk is indexed simultaneously with the data chunk being added to the respective data archive; and upload the respective data archive and the respective data index to a centralized storage of the distributed backup system; receiving, by the centralized storage, the plurality of data archives and a plurality of data indexes from the plurality of backup agents; and merging, by the centralized storage, the plurality of data indexes for access by a user.

In some aspects, the techniques described herein relate to a method, wherein the centralized storage includes a plurality of servers each configured to process a data index received from a respective backup agent of the plurality of backup agents.

In some aspects, the techniques described herein relate to a method, wherein adding additional backup agents to the plurality of backup agents does not require proportionally scaling an amount of servers in the centralized storage.

In some aspects, the techniques described herein relate to a method, wherein each respective backup agent is configured to build the respective data index based on a pre-existing full snapshot including a plurality of data chunks.

In some aspects, the techniques described herein relate to a method, wherein the respective backup agent is configured to map the data chunk to a specific region of the full snapshot when indexing.

In some aspects, the techniques described herein relate to a method, wherein the plurality of data chunks are indexed as folders and files.

In some aspects, the techniques described herein relate to a method, wherein each respective backup agent of the plurality of backup agents uses a different indexing scheme and includes an index identifier in the respective data index.

In some aspects, the techniques described herein relate to a method, wherein the centralized storage is configured to convert the plurality of data indexes into a universal indexing scheme prior to merging.

It should be noted that the methods described above may be implemented in a system comprising a hardware processor. Alternatively, the methods may be implemented using computer executable instructions of a non-transitory computer readable medium.

In some aspects, the techniques described herein relate to a system for managing distributed backups, including: at least one memory; at least one hardware processor coupled with the at least one memory and configured, individually or in combination, to: generate a plurality of data archives using a plurality of backup agents in the distributed backup system, wherein each respective backup agent is configured to: create a respective data archive; build a respective data index while populating the respective data archive such that a data chunk is indexed simultaneously with the data chunk being added to the respective data archive; and upload the respective data archive and the respective data index to a centralized storage of the distributed backup system; receive, by the centralized storage, the plurality of data archives and a plurality of data indexes from the plurality of backup agents; and merge, by the centralized storage, the plurality of data indexes for access by a user.

In some aspects, the techniques described herein relate to a non-transitory computer readable medium storing thereon computer executable instructions for managing a distributed backup system, including instructions for: generating a plurality of data archives using a plurality of backup agents in the distributed backup system, wherein each respective backup agent is configured to: create a respective data archive; build a respective data index while populating the respective data archive such that a data chunk is indexed simultaneously with the data chunk being added to the respective data archive; and upload the respective data archive and the respective data index to a centralized storage of the distributed backup system; receiving, by the centralized storage, the plurality of data archives and a plurality of data indexes from the plurality of backup agents; and merging, by the centralized storage, the plurality of data indexes for access by a user.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 3 illustrates a flow diagram of a method for generating a decentralized index for a distributed backup solution.

DETAILED DESCRIPTION

Exemplary aspects are described herein in the context of a system, method, and computer program product for generating a decentralized index for a distributed backup solution. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Consider an example in which a system has 1 centralized storage (comprised of M servers) and N backup sites with backup agents that produce 1 data archive per day. In a day, there will be a need to index N data archives having only the limited resource of the centralized storage. If this system is scaled by increasing the number of agents (e.g., add K agents) it results in the need to scale the centralized storage as well (e.g., add an additional server)—otherwise at some point the system will not be capable of processing all of the data archives in timely manner. This scaling issue is just one example of the limitations of conventional distributed backup systems.

In the present disclosure, backup agents are used to build index data along with the data archive creation process and store index information along with user data in the data archive. Once the data archive is uploaded into the centralized storage, the only action the centralized storage needs to do is to merge and store the index with existing indexes. This approach fully eliminates the need to spend centralized storage resources to index data and makes it capable of handling a growing number of backup agents without the need to be scaled in terms of processing power for building indexes.

Figure 1:
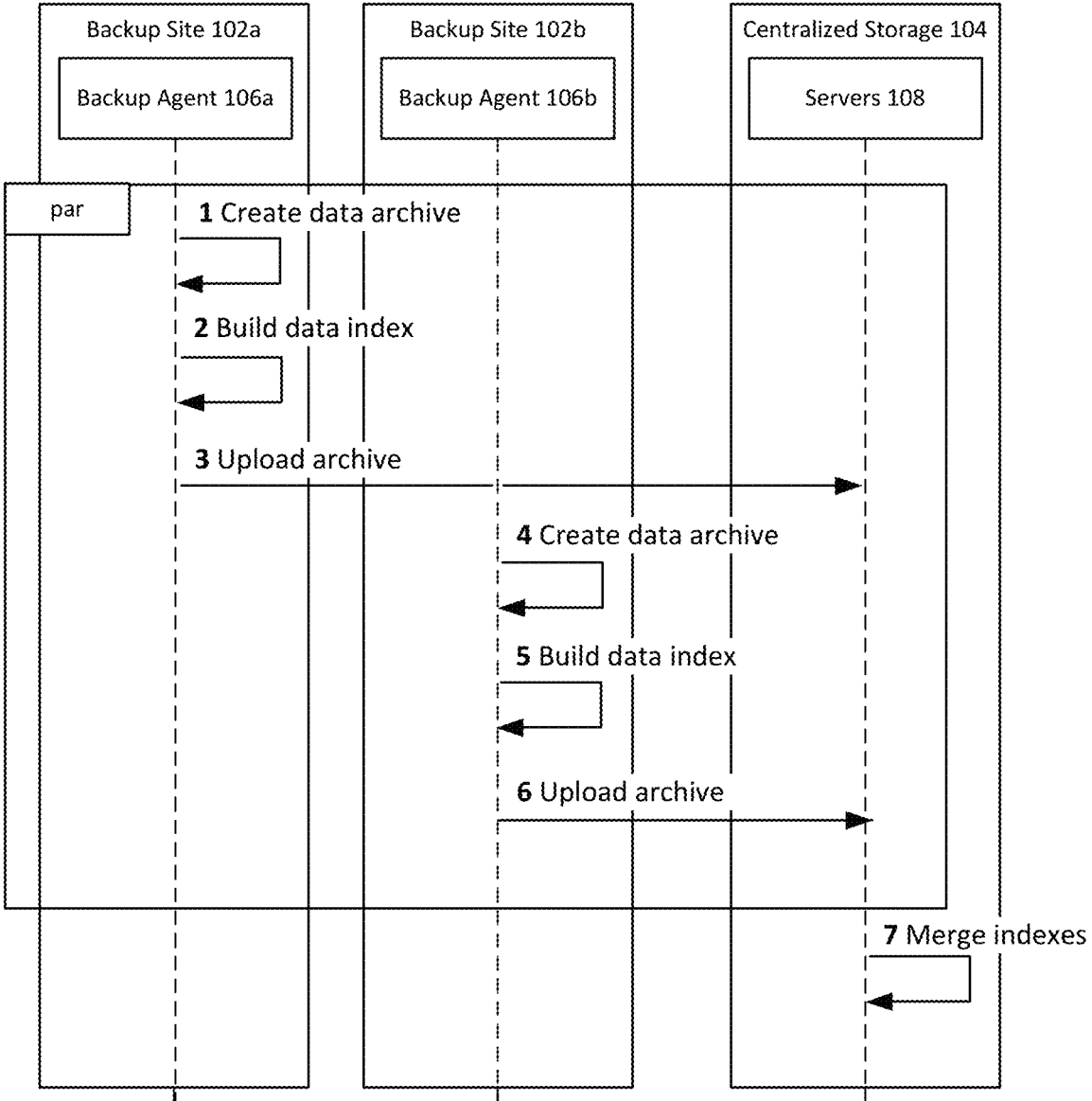
FIG. 1 is a block diagram illustrating a system for generating a decentralized index for a distributed backup solution.

FIG. 1 is a block diagram illustrating a system 100 for generating a decentralized index for a distributed backup solution. In system 100, there is one centralized storage 104 comprising multiple servers 108 (e.g., M servers). System 100 further includes N backup sites (e.g., backup site 102*a*, backup site 102*b*, etc.), each with its own backup agent (e.g., backup agent 106*a*, backup agent 106*b*, etc.). Each backup agent is configured to create a data archive, build a data index, and upload the archive to the centralized storage. The servers 108 of the centralized storage 104 merge all of the received indexes.

Determining when a backup agent should perform indexing is a challenge where trade-offs need to be considered. In particular, when to create a data index, how to link the data index with a data archive, and how to merge indexes in the centralized storage, all need to be factored into the determination.

For example, an approach in which a backup agent builds an index after every chunk of data is added into the archive will have an unnecessarily long backup operation time. Likewise, if a backup agent creates the index after the data archive is finalized and uploaded to the centralized storage, one needs to find a way to synchronize the index and the corresponding archive and make sure that the data index is up-to-date with the data archive. However, having a continuous backup process that constantly extends an archive makes this more difficult to achieve.

To address these issues, the present disclosure describes creating an index "on the fly" while a data chunk is being added into the data archive. This approach ensures that data retrieval is efficient and accurate. For instance, consider a scenario where a company is backing up its customer database. As each segment of the database (or data chunk) is archived, an index is simultaneously created. This index acts like a table of contents, allowing quick access to specific data points without scanning the entire archive. If the backup agent encounters an error, such as a network interruption or a disk write failure, and fails to write a data chunk or create its index, the system is designed to automatically restart both processes. This ensures that no data is lost and the index remains consistent. Consequently, when the data archive is finalized, both the data and its corresponding index are up-to-date, facilitating seamless data recovery and integrity checks.

The step-by-step creation of an index for each data chunk is possible due to an existing full snapshot of the source data on the agent-side, which is typically created as part of the backup process. For example, in a corporate environment, a full snapshot of the company's file server might be taken. This snapshot serves as a comprehensive reference point. As each data chunk is processed, it is mapped to a specific region of this full snapshot. This mapping allows the system to accurately index the data. During the indexing process, the full snapshot is mounted, enabling the system to interpret the data in a structured manner. For instance, if the snapshot is of a disk, the contents are indexed as folders and files, similar to how a file explorer organizes data. This structured indexing is crucial for efficient data retrieval, as it allows users to navigate through the archive as they would through a regular file system.

The concurrent generation of an index alongside the addition of a data chunk into the archive ensures that the overall backup time is not significantly extended. This parallel processing approach optimizes efficiency by allowing indexing to occur simultaneously with data archiving. Although this method requires additional CPU and RAM resources, advancements in technology have made these resources more affordable and widely available on backup agents. For example, a decade ago, the limited processing power and memory capacity of typical backup agents might have rendered on-the-fly indexing impractical. However, with modern advancements, even consumer-grade hardware can efficiently handle such tasks.

Creating an index "on the fly" while a data chunk is being added into a data archive involves a dynamic and real-time indexing process. In some aspects, a backup agent (e.g., 106*a*) may employ a background service or a dedicated thread that monitors incoming data. As a data chunk is received, backup agent 106*a* parses the chunk to identify key attributes and metadata that are relevant for indexing. The attributes and metadata may include unique identifiers, timestamps, or any other pertinent data points that facilitate quick retrieval. The indexing mechanism uses these attributes to update an index structure (e.g., a B-tree, a hash table, or any other efficient data structure suited for the specific use case). This real-time indexing ensures that the data is immediately searchable and retrievable, enhancing the performance of data queries.

Consider a modern enterprise environment where large volumes of data are routinely backed up. The ability to index data in real-time means that the system can quickly locate and retrieve specific data segments without the need for a complete scan of the archive. This is particularly beneficial in scenarios where rapid data recovery is critical, such as in financial institutions or healthcare settings where downtime can have significant repercussions.

Moreover, the reduction in backup time and the enhanced retrieval capabilities contribute to improved overall system performance and reliability, making this approach highly advantageous in today's data-driven landscape and the data-driven landscape of the future.

Figure 2:
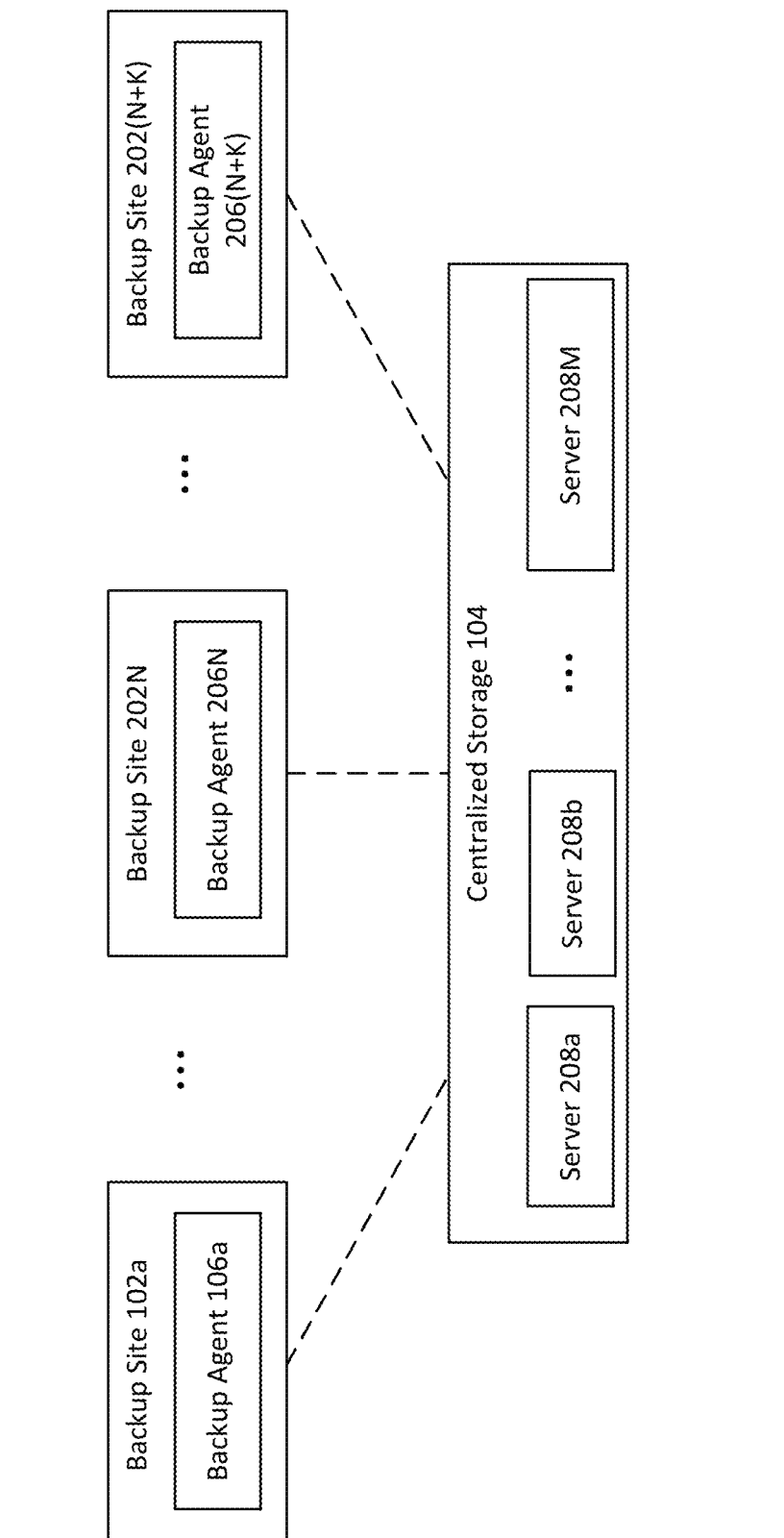
FIG. 2 is a block diagram illustrating a scaled distributed backup system.

FIG. 2 is a block diagram illustrating a scaled distributed backup system 200. As shown, adding K backup sites to the system 200 does not require adding additional servers to the centralized storage 104. For example, centralized storage 104 includes server 208a, 208b, . . . , 208M. Each of these servers is part of servers 108. Backup sites 102a, 102b, . . . , 202N are depicted each being serviced by a server in centralized storage 104. Even If K backup sites are added (e.g., backup site 202(N+K) including backup agent 206(N+K)), servers 208a, 208b, . . . , 208M can handle the added sites (i.e., adding K servers is not required).

It should be noted that different versions of backup agents may employ varying indexing approaches. This variation can arise from updates in technology, changes in data structures, or improvements in indexing algorithms. To ensure that the centralized storage system can accurately interpret and manage these different indexing methods, backup agents include an index version identifier with each generated archive. This identifier acts like a version tag, allowing the centralized system to recognize and process the index appropriately.

For example, consider a scenario where a company uses multiple backup agents across different departments, each potentially running different software versions. One department might use an older version that indexes data based on file names, while another uses a newer version that incorporates metadata indexing. By including an index version, the centralized storage can adapt to these differences seamlessly.

For each new data archive, the centralized storage extracts the index and, if necessary, adapts it into a standardized format based on its version. This ensures consistency across all stored data, regardless of the indexing method originally used. The adapted index is then added to a cumulative index, which serves as a comprehensive reference for all archived data.

The centralized storage system can rebuild this cumulative index as needed by traversing all data archives and extracting their indexes. This process is efficient because it does not require additional computations, such as mounting data archives or accessing the data within them. Instead, the system simply reads the index information, which is much faster and less resource-intensive.

For instance, in a large organization with extensive data archives, the ability to quickly rebuild a cumulative index without accessing the actual data can significantly reduce downtime and improve data retrieval speeds.

FIG. 3 illustrates a flow diagram of method 300 for generating a decentralized index for a distributed backup solution. At 302, a plurality of backup agents generate a plurality of data archives. Each respective backup agent is configured to perform a different step in step 302. For example, at 304, each respective backup agent creates a respective data archive.

At 306, each respective backup agent builds a respective data index while populating the respective data archive. The index is built "on-the-fly" such that a data chunk is indexed simultaneously with the data chunk being added to the respective data archive. For example, while the data chunk is added, the respective backup agent extracts attributes of the data chunk in parallel and indexes the data chunk based on the attributes.

In some aspects, each respective backup agent is configured to build the respective data index based on a pre-existing full snapshot comprising a plurality of data chunks. This enables the simultaneous indexing as a given respective backup agent can immediately map the data chunk to a specific region of the full snapshot when indexing (i.e., indexing is performed relative to the structure of the full snapshot).

To enable a backup agent to index a data chunk while simultaneously adding it to a data archive, ensuring that indexing is not delayed until after the chunk is fully added, a real-time processing approach is executed. In some aspects, the backup agent employs a streaming architecture, where data is processed in a continuous flow. As each data chunk is ingested, the backup agent may immediately divide the data chunk into smaller segments. This segmentation allows the agent to extract metadata and indexing information on-the-fly, such as timestamps, file types, and unique identifiers.

Parallel processing is employed, with one thread or process dedicated to writing the data to the archive and another handling the indexing tasks concurrently. In some aspects, the backup agent may use in-memory data structures, like hash tables or B-trees, to temporarily store indexing information, facilitating quick updates and lookups. This setup supports incremental index updates, where the index is refreshed with each processed segment, avoiding the need for a complete re-indexing after the entire chunk is added.

In some aspects, an event-driven architecture may be implemented, where the completion of writing at least one segment of the data chunk triggers an indexing event. This ensures synchronization between data writing and indexing processes. By integrating these strategies, the backup agent can efficiently manage both data storage and indexing in real-time, optimizing performance and ensuring immediate data accessibility.

In some aspects, the plurality of data chunks that are added to a given data archive are indexed as folders and files.

At 308, each respective backup agent uploads a respective data archive and a respective data index to a centralized storage of the distributed backup system. In some aspects, the centralized storage comprises a plurality of servers each configured to process a data index received from a respective backup agent of the plurality of backup agents. Using the indexing approach in method 300 ensures that adding additional backup agents to the plurality of backup agents will not require proportionally scaling an amount of servers in the centralized storage.

At 310, the centralized storage receives the plurality of data archives and a plurality of data indexes from the plurality of backup agents.

At 312, the centralized storage merges the plurality of data indexes for access by a user. In some aspects, each respective backup agent of the plurality of backup agents uses a different indexing scheme and includes an index identifier in the respective data index. For example, one backup agent might use a timestamp-based indexing scheme, where files are indexed by the date and time they were last modified, such as "2023-10-29T14:30:00Z". Another backup agent might use a file-type-based scheme, categorizing files under identifiers like "IMG" for images, "DOC" for documents, and "VID" for videos. Accordingly, the centralized storage is configured to convert the plurality of data indexes into a universal indexing scheme prior to merging. This conversion process involves standardizing timestamps to a common format like "YYYY-MM-DD HH:MM:SS" and unifying file type categories under a consistent taxonomy, such as using MIME types (e.g., "image/jpeg" for JPEG images, "application/pdf" for PDF documents). By doing so, the system ensures seamless integration and retrieval of data, allowing users to efficiently search and access information across diverse data sources. This approach not only enhances data accessibility but also improves the overall efficiency of data management within the centralized storage system.

Figure 4:
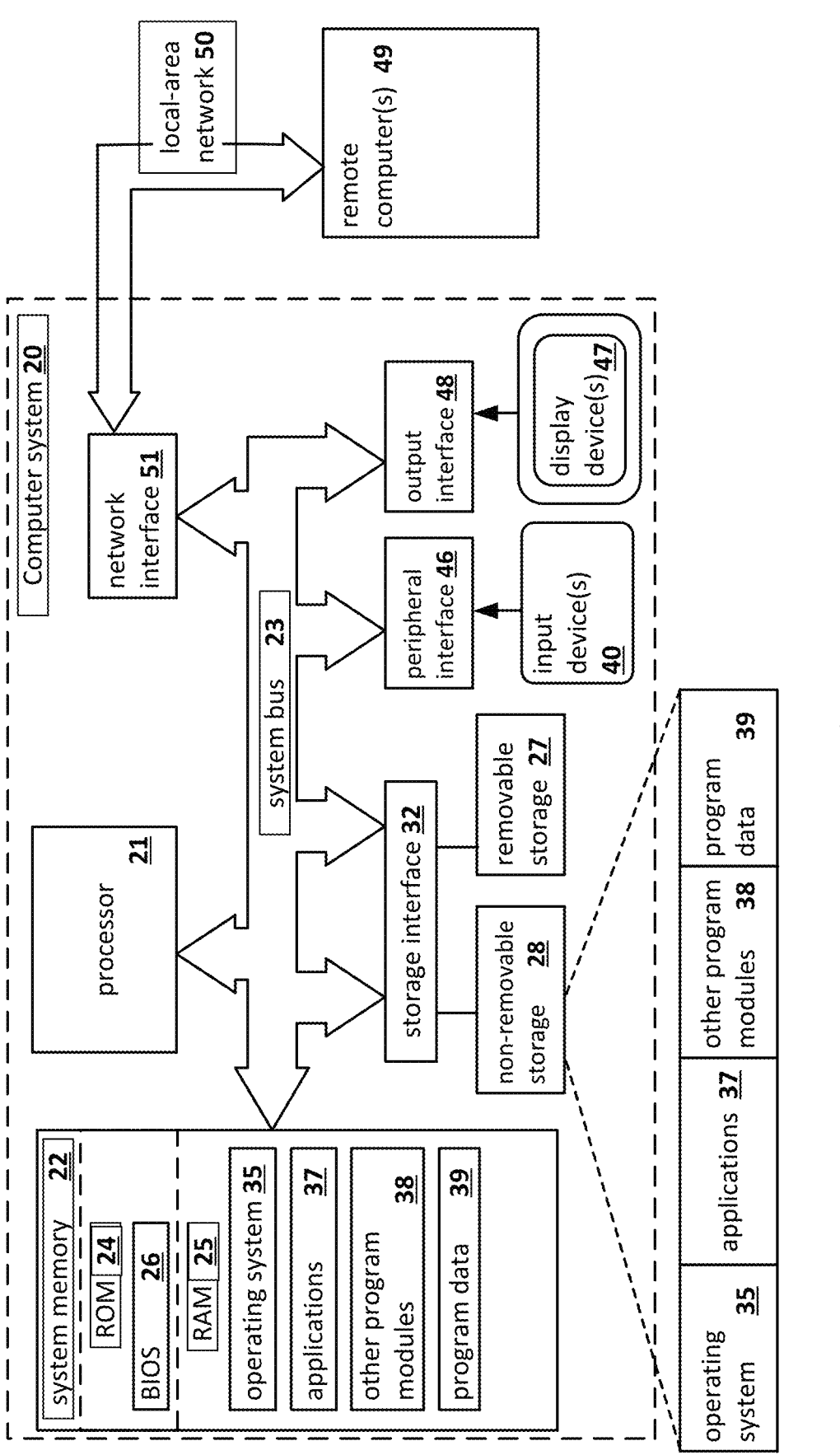
FIG. 4 presents an example of a general-purpose computer system on which aspects of the present disclosure can be implemented.

FIG. 4 is a block diagram illustrating a computer system 20 on which aspects of systems and methods for generating a decentralized index for a distributed backup solution may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-3 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for managing a distributed backup system, the method comprising:

generating a plurality of data archives using a plurality of backup agents in the distributed backup system, wherein each respective backup agent is configured to:

create a respective data archive;

build a respective data index while populating the respective data archive such that a data chunk is indexed simultaneously with the data chunk being added to the respective data archive; and upload the respective data archive and the respective data index to a centralized storage of the distributed backup system;

receiving, by the centralized storage, the plurality of data archives and a plurality of data indexes from the plurality of backup agents; and merging, by the centralized storage, the plurality of data indexes for access by a user without mounting the plurality of data archives or accessing data chunks within the plurality of data archives.

2. The method of claim 1, wherein the centralized storage comprises a plurality of servers each configured to process a data index received from a respective backup agent of the plurality of backup agents.

3. The method of claim 1, wherein adding additional backup agents to the plurality of backup agents does not require proportionally scaling an amount of servers in the centralized storage.

4. The method of claim 1, wherein each respective backup agent is configured to build the respective data index based on a pre-existing full snapshot comprising a plurality of data chunks.

5. The method of claim 4, wherein the respective backup agent is configured to map the data chunk to a specific region of the pre-existing full snapshot when indexing.

6. The method of claim 4, wherein the plurality of data chunks are indexed as folders and files.

7. The method of claim 1, wherein each respective backup agent of the plurality of backup agents uses a different indexing scheme and includes an index identifier in the respective data index.

8. The method of claim 7, wherein the centralized storage is configured to convert the plurality of data indexes into a universal indexing scheme prior to merging.

9. A system for managing distributed backups, comprising:

at least one memory;

at least one hardware processor coupled with the at least one memory and configured, individually or in combination, to:

generate a plurality of data archives using a plurality of backup agents in the distributed backup system, wherein each respective backup agent is configured to:

create a respective data archive;

build a respective data index while populating the respective data archive such that a data chunk is indexed simultaneously with the data chunk being added to the respective data archive; and upload the respective data archive and the respective data index to a centralized storage of the distributed backup system;

receive, by the centralized storage, the plurality of data archives and a plurality of data indexes from the plurality of backup agents; and merge, by the centralized storage, the plurality of data indexes for access by a user without mounting the plurality of data archives or accessing data chunks within the plurality of data archives.

10. The system of claim 9, wherein the centralized storage comprises a plurality of servers each configured to process a data index received from a respective backup agent of the plurality of backup agents.

11. The system of claim 9, wherein adding additional backup agents to the plurality of backup agents does not require proportionally scaling an amount of servers in the centralized storage.

12. The system of claim 9, wherein each respective backup agent is configured to build the respective data index based on a pre-existing full snapshot comprising a plurality of data chunks.

13. The system of claim 12, wherein the respective backup agent is configured to map the data chunk to a specific region of the pre-existing full snapshot when indexing.

14. The system of claim 12, wherein the plurality of data chunks are indexed as folders and files.

15. The system of claim 9, wherein each respective backup agent of the plurality of backup agents uses a different indexing scheme and includes an index identifier in the respective data index.

16. The system of claim 15, wherein the centralized storage is configured to convert the plurality of data indexes into a universal indexing scheme prior to merging.

17. A non-transitory computer readable medium storing thereon computer executable instructions for managing a distributed backup system, including instructions for:

generating a plurality of data archives using a plurality of backup agents in the distributed backup system, wherein each respective backup agent is configured to:

create a respective data archive;

build a respective data index while populating the respective data archive such that a data chunk is indexed simultaneously with the data chunk being added to the respective data archive; and upload the respective data archive and the respective data index to a centralized storage of the distributed backup system;

receiving, by the centralized storage, the plurality of data archives and a plurality of data indexes from the plurality of backup agents; and merging, by the centralized storage, the plurality of data indexes for access by a user without mounting the plurality of data archives or accessing data chunks within the plurality of data archives.

* * * * *